(12) United States Patent
Celik

(10) Patent No.: US 11,124,024 B2
(45) Date of Patent: Sep. 21, 2021

(54) SUPPORT STRUCTURE

(71) Applicant: The Goodyear Tire & Rubber Company, Akron, OH (US)

(72) Inventor: Ceyhan Celik, Stow, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 172 days.

(21) Appl. No.: 16/693,421

(22) Filed: Nov. 25, 2019

(65) Prior Publication Data

US 2021/0155036 A1    May 27, 2021

(51) Int. Cl.
*B60C 7/24* (2006.01)
*B60B 9/26* (2006.01)

(52) U.S. Cl.
CPC ............ *B60C 7/24* (2013.01); *B60B 9/26* (2013.01); *B60B 2310/211* (2013.01); *B60B 2900/313* (2013.01)

(58) Field of Classification Search
CPC ........ B60C 7/24; B60B 9/26; B60B 2900/313
See application file for complete search history.

(56) References Cited

U.S. PATENT DOCUMENTS

| | | |
|---|---|---|
| 479,255 A | 7/1892 | Dunlop |
| 482,175 A | 9/1892 | Hollafolla |
| 927,891 A * | 7/1909 | Stanclift .................. B60B 9/26 152/86 |
| 1,002,003 A | 8/1911 | Simonson et al. |
| 1,016,991 A | 2/1912 | Herold |
| 1,233,722 A | 7/1917 | Smith |
| 1,389,285 A | 8/1921 | Althoff |
| 1,451,517 A | 4/1923 | Smith |
| 1,481,138 A * | 1/1924 | Luce .......................... B60B 9/26 152/84 |
| 1,930,764 A | 10/1933 | Mallory |
| 3,493,027 A | 2/1970 | Dewhirst et al. |
| 4,226,273 A | 10/1980 | Long et al. |
| 4,235,270 A | 11/1980 | Kahaner et al. |
| 4,602,823 A | 7/1986 | Berg |
| 4,798,418 A | 1/1989 | Kempf et al. |
| 5,343,916 A | 9/1994 | Duddey et al. |

(Continued)

FOREIGN PATENT DOCUMENTS

WO    2017117598    7/2017

OTHER PUBLICATIONS

Celik, U.S. Appl. No. 16/685,176, filed Nov. 20, 2019.

*Primary Examiner* — Kip T Kotter
(74) *Attorney, Agent, or Firm* — Robert N. Lipcsik

(57) ABSTRACT

A wheel assembly includes a hub for attachment to a rotatable axle, a plurality of first friction plates each engaging a first surface of one part of a plurality of parts of a tire assembly, a plurality of second friction plates each engaging a second surface of the one part of a plurality of parts of a tire assembly, the second surface being radially opposite the first surface, and a plurality of radial cable members each connecting the hub to the tire assembly such that each radial cable member extends radially away from the hub, bends circumferentially adjacent a corresponding second friction plate, bends radially outward and back circumferentially adjacent a corresponding first friction plate, and radially inward to a first point of intersection with the same radial cable member.

20 Claims, 2 Drawing Sheets

(56) References Cited

U.S. PATENT DOCUMENTS

| | | |
|---|---|---|
| 5,800,643 A | 9/1998 | Frankowski |
| 6,068,721 A | 5/2000 | Dyer et al. |
| 6,260,598 B1 | 7/2001 | Tanaka |
| 6,286,572 B1 | 9/2001 | Chen |
| 7,032,634 B2 | 4/2006 | Laurent et al. |
| 8,962,120 B2 | 2/2015 | Delfino et al. |
| 8,978,726 B2 | 3/2015 | Hutchinson |
| 9,387,726 B2 | 7/2016 | Choi et al. |
| 10,040,317 B2 | 8/2018 | Celik |
| 10,150,334 B2 | 12/2018 | Celik |
| 10,207,544 B2 | 2/2019 | Celik |
| 10,286,725 B2 | 5/2019 | Celik et al. |
| 10,406,852 B2 | 9/2019 | Celik et al. |
| 10,421,319 B2 | 9/2019 | Gaylo et al. |
| 10,449,805 B2 | 10/2019 | Shoji |
| 2003/0201043 A1 | 10/2003 | Adams et al. |
| 2004/0069385 A1 | 4/2004 | Timoney et al. |
| 2006/0144488 A1 | 7/2006 | Vannan |
| 2010/0193097 A1 | 8/2010 | McNier et al. |
| 2012/0205017 A1 | 8/2012 | Endicott |
| 2014/0083581 A1 | 3/2014 | Schaedler et al. |
| 2016/0214435 A1 | 7/2016 | Schaedler et al. |
| 2017/0087930 A1 | 3/2017 | Mcmaster et al. |
| 2017/0087931 A1 | 3/2017 | Gaylo et al. |
| 2017/0326915 A1* | 11/2017 | Son, II .............. B60C 7/10 |
| 2018/0001704 A1 | 1/2018 | Reinhardt |

* cited by examiner

SUPPORT STRUCTURE

FIELD OF INVENTION

The present invention relates to wheel/tire assemblies, and more particularly, to non-pneumatic wheel/tire assemblies.

BACKGROUND OF THE INVENTION

Radial pneumatic tires rely on the ply reinforcement to carry and transfer the load between the rim and the belt layer. These ply cords need to be tensioned to carry the load. Tensioning of these ply cords is achieved with the pressurized air in the inner chamber of the tire. If air pressure is lost, load carrying capacity of a pneumatic tire decreases significantly. Preventing the slow or sudden air pressure loss has been a challenge for the tire makers. One proposed solution is to use non-pneumatic tires. A top loader non-pneumatic tire can perform similar to a pneumatic tire if its durability, speed rating/limit and load capacity can be increased to the levels of a pneumatic tire.

Many top loader non-pneumatic tires rely on the polymeric spokes to carry the load of the vehicle. Spokes transfer the load from the rim to the shear band. Due to the characteristics of the polymeric materials used in the spokes of these tires, performance of these tires are limited. It is an object of the present invention to overcome this limitation and increase the load carrying capacity and durability of these spokes and hence the performance of the top loader non-pneumatic tire.

SUMMARY OF THE INVENTION

A first wheel assembly in accordance with the present invention includes a hub for attachment to a rotatable axle, a plurality of first friction plates each engaging a first surface of one part of a plurality of parts of a tire assembly, a plurality of second friction plates each engaging a second surface of the one part of a plurality of parts of a tire assembly, the second surface being radially opposite the first surface, and a plurality of radial cable members each connecting the hub to the tire assembly such that each radial cable member extends radially away from the hub, bends circumferentially adjacent a corresponding second friction plate, bends radially outward and back circumferentially adjacent a corresponding first friction plate, and radially inward to a first point of intersection with the same radial cable member.

According to another aspect of the first wheel assembly, a plurality of first claw members each engages one radial cable member of the plurality radial cable members and a plurality of second claw members each engages the one radial cable member of the plurality radial cable members.

According to still another aspect of the first wheel assembly, a clamp member radially secures each corresponding cable member, each corresponding first friction plate, and each corresponding second friction plate.

According to yet another aspect of the first wheel assembly, each first claw member is disposed radially adjacent a corresponding first friction plate.

According to still another aspect of the first wheel assembly, each second claw member is disposed radially adjacent a corresponding second friction plate.

According to yet another aspect of the first wheel assembly, a first part of each radial cable member is secured to a second different part of the same radial cable member at a point of intersection.

According to still another aspect of the first wheel assembly, a first part of each radial cable member is welded to a second different part of the same radial cable member at a point of intersection.

According to yet another aspect of the first wheel assembly, a first part of each radial cable member is molded to a second different part of the same radial cable member at a point of intersection.

According to still another aspect of the first wheel assembly, a first part of each radial cable member is fused to a second different part of the same radial cable member at a point of intersection.

According to yet another aspect of the first wheel assembly, a first part of each radial cable member is bolted to a second different part of the same radial cable member at a point of intersection.

A second wheel assembly in accordance with the present invention includes a hub for attachment to a rotatable axle, a plurality of first friction plates each engaging a first surface of one part of a plurality of parts of a tire assembly, a plurality of second friction plates each engaging a second surface of the one part of a plurality of parts of a tire assembly, the second surface being radially opposite the first surface, a plurality of first radial cable members each connecting the hub to the tire assembly, and a plurality of second circumferential cable members interconnecting circumferentially adjacent first cable members at defined radial distances from an axis of rotation of the wheel assembly.

According to another aspect of the second wheel assembly, the defined radial distances of each second cable member, circumferentially between each first cable member, are identical such that each first cable member has second cable members converging from each circumferential side to a single intersection point at each first cable member.

According to still another aspect of the second wheel assembly, the second cable members form a group of concentric polygons with vertices only at intersection points on each first member.

According to yet another aspect of the second wheel assembly, each first cable member is secured to the tire assembly by an arrangement of a corresponding first friction plate, a corresponding second friction plate, two claw members, and one clamp member.

According to still another aspect of the second wheel assembly, each first cable member is secured to the tire assembly by an arrangement of a corresponding first friction plate, a corresponding second friction plate, and a point of intersection at which one part of each first cable member is secured to another different part of the same first cable member.

A method in accordance with the present invention rotationally secures a wheel assembly to a tire assembly. The method includes the steps of: extending each first cable member of a plurality of first cable members radially away from a hub; subsequent to the immediately previous step, bending each first cable member of the plurality of first cable members to circumferentially extend radially adjacent each first friction plate of a plurality of first friction plates; subsequent to the immediately previous step, extending each first cable member of the plurality of first cable members radially outward; subsequent to the immediately previous step, extending each first cable member of the plurality of first cable members to circumferentially extend adjacent each second friction plate of the plurality of second friction plates; and subsequent to the immediately previous step, interconnecting each first cable member to two circumferentially adjacent first cable members with a plurality of circumferentially extending second cable members.

According to another aspect of the method, a further step includes securing each first cable member to two second cable members at a single location.

According to still another aspect of the method, a further step includes securing each first cable member to two second cable members at a single location on each first cable member.

According to yet another aspect of the method, a further step includes welding each first cable member to two second cable members at a single location.

According to still another aspect of the method, a further step includes securing each first cable member to two second cable members a single location at multiple locations on each first cable member.

BRIEF DESCRIPTION OF THE DRAWINGS

The present invention will be more clearly understood by the following description of some examples thereof, with reference to the accompanying drawings, in which.

DESCRIPTION OF EXAMPLES OF THE PRESENT INVENTION

A conventional wheel/tire assembly, such as that described in US 2004/0069385, incorporated herein by reference in its entirety, may have an outer ring, such as a shear band, flexibly connected to a central hub by means of lightweight composite springs. The springs may be plates fixed to the ring and to the hub. The hub may contain a speed reduction gear unit and/or an electric motor and may have a suspension mechanism for connecting a vehicle chassis to each wheel. The ring may be constructed from a flexible composite material, such as carbon fiber reinforced nylon material and have twin rubber tires and a plurality of circumferentially spaced-apart radial cleats which engage the ground and provide improved traction. The hub may also be formed from a carbon fiber reinforced composite material. Another conventional wheel may have a rubber strip with a molded tread bonded to a composite ring for improved grip. Further, the springs interconnecting the ring and hub may be S-shaped lightweight composite springs.

Another conventional wheel/tire assembly may be formed from a lightweight composite material, such as carbon fiber reinforced polyamide. The assembly may have a cylindrical central hub and a circular outer flexible rim mounted on the central hub by an endless looped spring band extending between the central hub and the circular rim. Six radial loops may be defined by the spring band. The spring band may be attached to the central hub and to the circular rim by any suitable means, such as adhesion, cohesion, soldering and/or mechanical fixing by means of bolts, rivets, and/or clamps.

Figure 1:
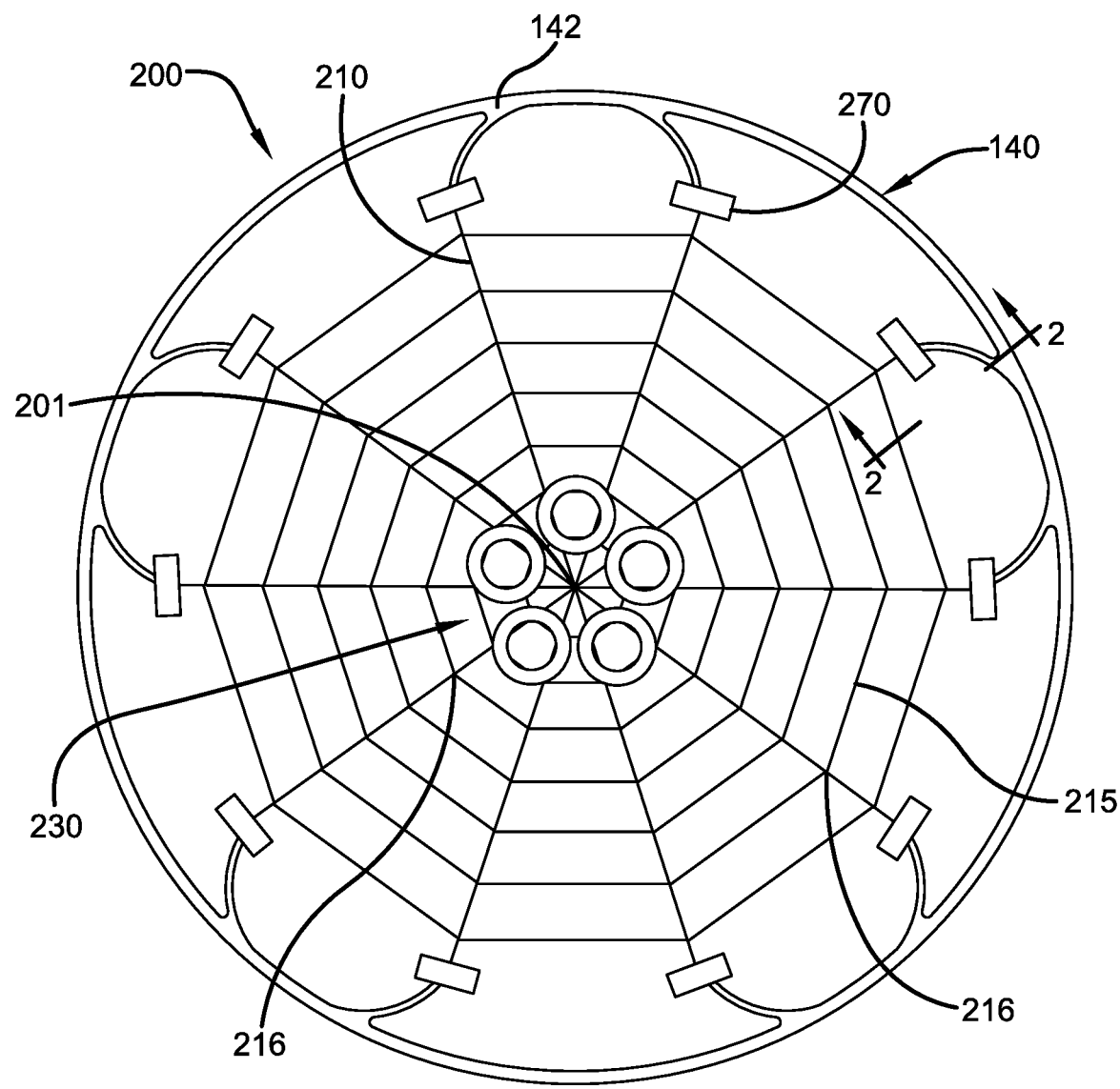
FIG. 1 is a schematic side view of an example wheel assembly in accordance with the present invention and an example tire assembly.
Figure 2:
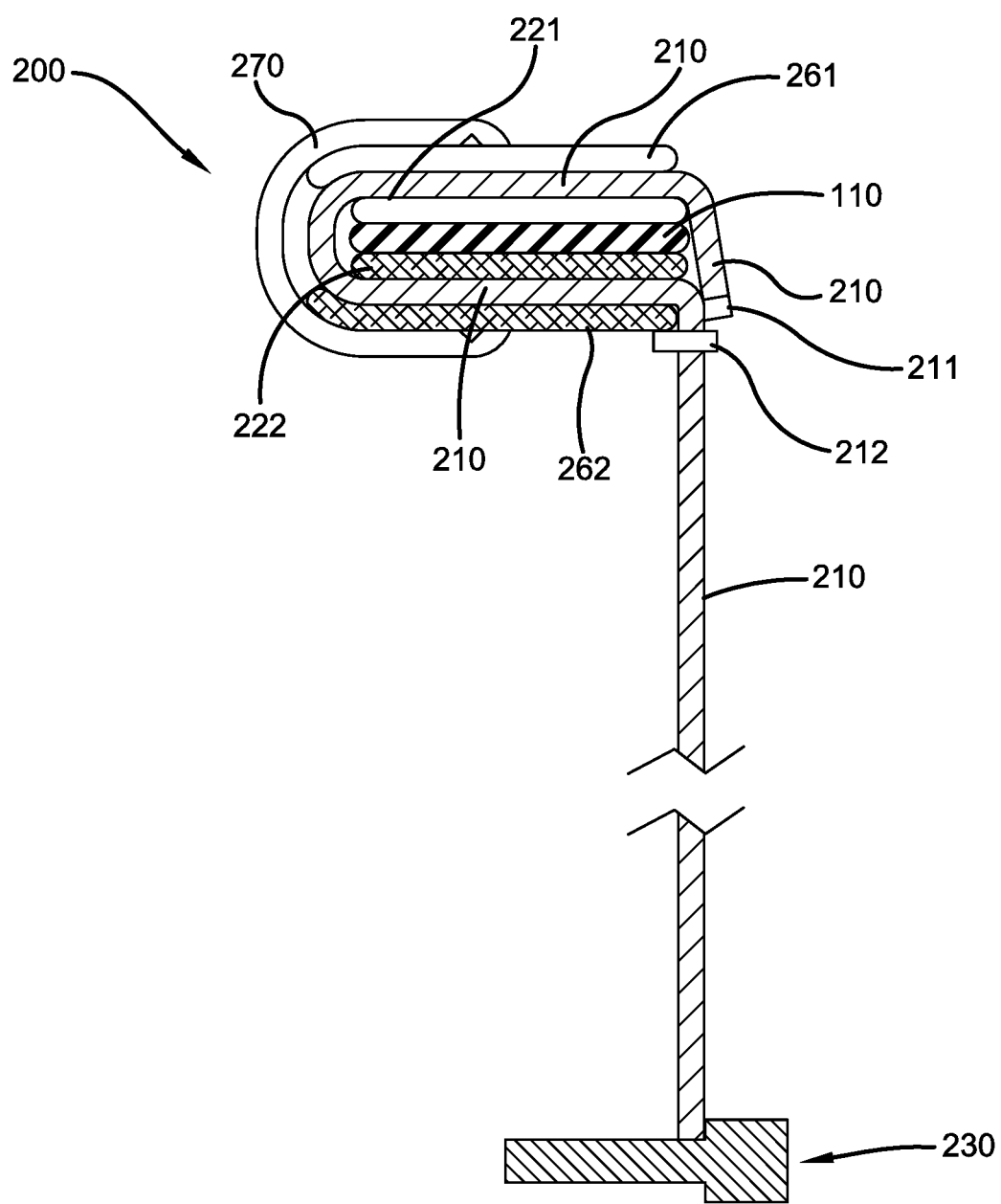
FIG. 2 is a schematic circumferential view of part of the wheel assembly of FIG. 1 taken along line '2-2' in FIG. 1.

As shown in FIGS. 1-2, an example tire assembly 140, for use with the present invention, may be formed from a lightweight polymer material, such as, for example, a standard tire rubber compound, a thermoplastic polymer, polyethylene terephthalate (PET), polyether ether ketone (PEEK), a cross-linking polymer like natural rubber, synthetic rubber-like polymers, epoxy resins, and/or phenolic resins. The tire assembly 140 may have an outer flexible ring 142, which may include a shear band and tread structure, mounted on the inner central rim by a continuous cord/fabric reinforced spoke structure 110 extending between a rim and the outer ring 142.

The spoke structure 110 may define a plurality of extension arms disposed concentrically about the rim allowing the spoke structure to deflect under load thereby defining a suitable balance between flexibility for ride comfort and traction within a footprint of the assembly 140 and stiffness for vehicle handling, low rolling resistance, and low heat build-up within the spoke structure 110. The spoke structure 110 may engage portions of the rim in a mechanical interlocking arrangement. The rim may further include plates that, along with portions of the rim may sandwich portions of the spoke structure 110 and create a further frictional and/or adhesive securement between the rim and the spoke structure. The spoke structure 110 may comprise a homogenous or heterogeneous polymer and/or a filled polymer.

FIGS. 1-2 show a wheel assembly 200 in accordance with the present invention for use with pneumatic and/or non-pneumatic tire assemblies, such as the assembly 140. The wheel assembly 200 may include a plurality of radial cable members 210 (10 shown) for attachment to a hub 230 of the wheel assembly 200 and a rotatable axle or similar structure (not shown), a plurality of first friction plates 221 and a plurality of second frictions plates 222 for engaging each corresponding radial cable member 210 and an individual terminal end part of the spoke structure 110 of the tire assembly 140. The wheel assembly 200 may further include a plurality of first claw members 261, a plurality of second claw members 262, and a clamp member 270 for further engaging each corresponding cable member 210, each corresponding first friction plate 221, and each corresponding second friction plate 222.

In order to further support the radial cable members 210 and the overall wheel assembly 200, a plurality of circumferential cable members 215 may interconnect adjacent radial cable members 210 at defined radial distances from the axis of rotation 201 of the wheel assembly 200. As shown in FIG. 1, the radial distances of each circumferential cable member 215 between each pair of radial cable members 210 may be identical such that each radial cable member 210 may have circumferential cable members 215 converging from each circumferential side to a single intersection point 216 at the radial cable member 210 (7 shown in FIG. 1 for each circumferential cable member 215). The circumferential cable members 215 thereby form a group of concentric polygons (7 decagons shown in FIG. 1) with vertices only at the intersection points 216 of the radial cable members 210.

During assembly, each radial cable member 210 may extend radially away from the hub 230, bend circumferentially between a corresponding second friction plate 222 and a corresponding second claw member 262, bend radially outward and back circumferentially between a corresponding first friction plate 221 and a corresponding first claw member 261, and radially inward to a first point of intersection 211 with the same radial cable member (FIG. 2). The first point of intersection 211 may secure the radial cable member 210 to itself by a suitable method, such as welding, molding, fusing, adhering with adhesive, bolting to mounting tabs (not shown), clamping, and/or other suitably robust methods, etc. Each radial cable member 210 may also be secured to the corresponding second claw member 262 at a second point of intersection 212 by a suitable method, such as welding, molding, fusing, adhering with adhesive, bolting to mounting tabs (not shown), clamping, and/or other suitably robust methods, etc.

Variations in the present invention are possible in light of the description of it provided herein. While certain representative examples and details have been shown for the purpose of illustrating the subject invention, it will be apparent to those skilled in this art that various changes and modifications can be made therein without departing from the scope of the subject invention. It is, therefore, to be understood that changes can be made in the particular examples described which will be within the full scope of the present invention as defined by the following appended claims. Further, the present invention is not limited to the examples hereinbefore described which may be varied in both construction and detail within the full scope of the appended claims.

What is claimed:

1. A wheel assembly comprising:
a hub for attachment to a rotatable axle;
a plurality of first friction plates each engaging a first surface of one part of a plurality of parts of a tire assembly;
a plurality of second friction plates each engaging a second surface of the one part of a plurality of parts of a tire assembly, the second surface being radially opposite the first surface; and
a plurality of radial cable members each connecting the hub to the tire assembly such that each radial cable member extends radially away from the hub, bends circumferentially adjacent a corresponding second friction plate, bends radially outward and back circumferentially adjacent a corresponding first friction plate, and radially inward to a first point of intersection with the same radial cable member.

2. The wheel assembly as set forth in claim 1 further including a plurality of first claw members each engaging one radial cable member of the plurality radial cable members and a plurality of second claw members each engaging the one radial cable member of the plurality radial cable members.

3. The wheel assembly as set forth in claim 1 further including a clamp member for radially securing each corresponding cable member, each corresponding first friction plate, and each corresponding second friction plate.

4. The wheel assembly as set forth in claim 2 wherein each first claw member is disposed radially adjacent a corresponding first friction plate.

5. The wheel assembly as set forth in claim 2 wherein each second claw member is disposed radially adjacent a corresponding second friction plate.

6. The wheel assembly as set forth in claim 1 wherein a first part of each radial cable member is secured to a second different part of the same radial cable member.

7. The wheel assembly as set forth in claim 1 wherein a first part of each radial cable member is welded to a second different part of the same radial cable member.

8. The wheel assembly as set forth in claim 1 wherein a first part of each radial cable member is molded to a second different part of the same radial cable member.

9. The wheel assembly as set forth in claim 1 wherein a first part of each radial cable member is fused to a second different part of the same radial cable member.

10. The wheel assembly as set forth in claim 1 wherein a first part of each radial cable member is bolted to a second different part of the same radial cable member.

11. A wheel assembly comprising:
a hub for attachment to a rotatable axle;
a plurality of first friction plates each engaging a first surface of one part of a plurality of parts of a tire assembly;
a plurality of second friction plates each engaging a second surface of the one part of a plurality of parts of a tire assembly, the second surface being radially opposite the first surface;
a plurality of first radial cable members each connecting the hub to the tire assembly; and
a plurality of second circumferential cable members interconnecting circumferentially adjacent first cable members at defined radial distances from an axis of rotation of the wheel assembly.

12. The wheel assembly as set forth in claim 11 wherein the defined radial distances of each second cable member, circumferentially between each first cable member, are identical such that each first cable member has second cable members converging from each circumferential side to a single intersection point at each first cable member.

13. The wheel assembly as set forth in claim 11 wherein the second cable members form a group of concentric polygons with vertices only at intersection points on each first member.

14. The wheel assembly as set forth in claim 11 wherein each first cable member is secured to the tire assembly by an arrangement of a corresponding first friction plate, a corresponding second friction plate, two claw members, and one clamp member.

15. The wheel assembly as set forth in claim 11 wherein each first cable member is secured to the tire assembly by an arrangement of a corresponding first friction plate, a corresponding second friction plate, and a point of intersection at which one part of each first cable member is secured to another different part of the same first cable member.

16. A method for rotationally securing a wheel assembly to a tire assembly, the method comprising the steps of:
extending each first cable member of a plurality of first cable members radially away from a hub;
subsequent to the immediately previous step, bending each first cable member of the plurality of first cable members to circumferentially extend radially adjacent each first friction plate of a plurality of first friction plates;
subsequent to the immediately previous step, extending each first cable member of the plurality of first cable members radially outward;
subsequent to the immediately previous step, extending each first cable member of the plurality of first cable members to circumferentially extend adjacent each second friction plate of the plurality of second friction plates; and
subsequent to the immediately previous step, interconnecting each first cable member to two circumferentially adjacent first cable members with a plurality of circumferentially extending second cable members.

17. The method as set forth in claim 16 further including the step of securing each first cable member to two second cable members at a single location.

18. The method as set forth in claim 16 further including the step of securing each first cable member to two second cable members at a single location on each first cable member.

19. The method as set forth in claim 16 further including the step of welding each first cable member to two second cable members at a single location.

20. The method as set forth in claim 16 further including the step of securing each first cable member to two second cable members at a single location at multiple locations on each first cable member.

* * * * *